US009255659B2

(12) United States Patent
Cottard et al.

(10) Patent No.: US 9,255,659 B2
(45) Date of Patent: Feb. 9, 2016

(54) LIGHT-WEIGHT DEVICE FOR LOADING SOLID PARTICLES

(75) Inventors: Bernard Cottard, Saint Romain de Colbosc (FR); Pascal Leroy, Montivilliers (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 286 days.

(21) Appl. No.: 13/990,294

(22) PCT Filed: Dec. 21, 2011

(86) PCT No.: PCT/FR2011/053127
§ 371 (c)(1),
(2), (4) Date: May 29, 2013

(87) PCT Pub. No.: WO2012/089965
PCT Pub. Date: Jul. 5, 2012

(65) Prior Publication Data
US 2013/0248025 A1 Sep. 26, 2013

(30) Foreign Application Priority Data
Dec. 27, 2010 (FR) ...................................... 10 61271

(51) Int. Cl.
*B01J 4/00* (2006.01)
*F16L 55/00* (2006.01)
*B01J 8/00* (2006.01)
*B65G 69/16* (2006.01)

(52) U.S. Cl.
CPC ................. *F16L 55/00* (2013.01); *B01J 8/002* (2013.01); *B01J 8/003* (2013.01); *B65G 69/16* (2013.01); *B01J 2208/00752* (2013.01); *B01J 2208/00778* (2013.01); *Y10T 137/8376* (2015.04)

(58) Field of Classification Search
CPC .......... F16L 55/00; B01J 8/002; B01J 8/003; B01J 2208/00752; B01J 2208/00778; B65G 69/16; Y10T 137/8376
USPC .................................. 141/250, 286, 290, 392
See application file for complete search history.

(56) References Cited

U.S. PATENT DOCUMENTS

| 2,985,341 | A | * | 5/1961 | Howell | 222/267 |
| 4,074,836 | A | * | 2/1978 | Muller, Jr. | 222/564 |
| 4,433,707 | A | * | 2/1984 | Farnham | 141/1 |
| 4,476,670 | A |   | 10/1984 | Ukai et al. | |
| 4,564,328 | A | * | 1/1986 | Loutaty et al. | 414/301 |

(Continued)

FOREIGN PATENT DOCUMENTS

| DE | 20 2006 003784 U1 | 7/2006 |
| FR | 2 901 778 A1 | 12/2007 |
| GB | 828676 A | 2/1960 |

*Primary Examiner* — Nicolas A Arnett
(74) *Attorney, Agent, or Firm* — Sughrue Mion, PLLC

(57) ABSTRACT

The invention relates to a light-weight device for loading solid particles into an enclosure including at least one pipe (18, 20) for the circulation of said solid particles and at least one movable element for controlling the fall velocity of the particles, which is designed to be slidably moved inside of said pipe (18, 20). The device further includes a plurality of identical guide plates (12a, 12b) connected to each other by attachment means. Said at least one pipe (18, 20) is made of a flexible material and each guide plate (12a, 12b) has at least one through opening for receiving and guiding said at least one pipe (18, 20) in a position in which the longitudinal axis of the pipe extends substantially perpendicular to the plane of each guide plate.

19 Claims, 2 Drawing Sheets

(56) References Cited

U.S. PATENT DOCUMENTS

| | | | |
|---|---|---|---|
| 4,972,884 A * | 11/1990 | Souers et al. | 141/1 |
| 5,154,271 A | 10/1992 | Binzen | |
| 5,238,035 A * | 8/1993 | Poussin et al. | 141/286 |
| 5,244,129 A * | 9/1993 | Poussin et al. | 222/410 |
| 5,296,202 A * | 3/1994 | Souers et al. | 422/219 |
| 5,687,780 A * | 11/1997 | Minami | 141/286 |
| 5,697,408 A | 12/1997 | Reeves | |
| 5,950,694 A * | 9/1999 | Jama et al. | 141/286 |
| 6,467,513 B1 * | 10/2002 | Yanaru et al. | 141/12 |
| 6,805,171 B2 * | 10/2004 | Crespin et al. | 141/11 |
| 6,880,591 B2 * | 4/2005 | Goemans et al. | 141/286 |
| 6,905,660 B2 * | 6/2005 | Harper et al. | 422/232 |
| 7,121,309 B2 * | 10/2006 | Goemans et al. | 141/237 |
| 7,285,251 B2 * | 10/2007 | Johns et al. | 422/219 |
| 7,588,061 B2 * | 9/2009 | Poussin | 141/286 |
| 7,673,660 B2 * | 3/2010 | McNaughton | 141/251 |
| 7,712,490 B2 * | 5/2010 | Brennom | 141/12 |
| 7,770,613 B2 * | 8/2010 | Brennom | 141/250 |
| 7,828,023 B2 * | 11/2010 | Patureaux et al. | 141/251 |
| 7,836,919 B2 * | 11/2010 | Johns et al. | 141/1 |
| 7,878,428 B2 * | 2/2011 | Pinon et al. | 239/684 |
| 8,025,472 B2 * | 9/2011 | Fry | 414/160 |
| 8,287,227 B2 * | 10/2012 | Fry | 414/804 |
| 8,887,773 B2 * | 11/2014 | Cottard et al. | 141/286 |
| 8,910,676 B2 * | 12/2014 | Cottard et al. | 141/286 |
| 8,948,910 B2 * | 2/2015 | Cottard et al. | 700/218 |
| 2001/0017252 A1 | 8/2001 | Papera | |
| 2006/0213575 A1 * | 9/2006 | McNaughton | 141/286 |
| 2007/0084519 A1 * | 4/2007 | Brennom | 141/2 |
| 2007/0297880 A1 * | 12/2007 | Pinon et al. | 414/301 |
| 2008/0149215 A1 * | 6/2008 | Patureaux et al. | 141/1 |
| 2009/0090429 A1 | 4/2009 | Cochrane et al. | |
| 2010/0256803 A1 * | 10/2010 | Cottard et al. | 700/218 |
| 2011/0147319 A1 * | 6/2011 | Cottard et al. | 210/749 |
| 2011/0201856 A1 * | 8/2011 | Cottard et al. | 585/250 |
| 2011/0253249 A1 * | 10/2011 | Cottard et al. | 141/1 |
| 2013/0025739 A1 * | 1/2013 | Cottard et al. | 141/1 |

* cited by examiner

LIGHT-WEIGHT DEVICE FOR LOADING SOLID PARTICLES

CROSS REFERENCE TO RELATED APPLICATIONS

This application is a National Stage of International Application No. PCT/FR2011/053127, filed on Dec. 21, 2011, which claims priority from French Patent Application No. 1061271, filed on Dec. 27, 2010, the contents of all of which are incorporated herein by reference in their entirety.

The invention relates to a light-weight device for loading solid particles into an enclosure, notably into a large enclosure with a height which may be as much as several tens of meters.

BACKGROUND OF THE INVENTION

The device according to the invention is more specifically applicable to the loading of fixed-bed catalytic chemical, petroleum or petrochemical reactors with solid particles in the divided state, which may take the form of balls, pellets, cylinders, disks, rods, or bodies of any other shape, but which are generally of relatively small size. These solid particles are, more specifically, chemically inert balls used in chemical reactors, molecular sieves, or catalyst pellets used in transformation reactions of chemical or hydrocarbon products, for example reforming, cracking, hydrocarbon desulfurization, or, more generally, the hydrotreatment of petroleum fractions. Such particles usually take the form of balls, extrusions or multilobe elements whose dimensions vary according to circumstances, from a few tenths of a millimeter to a few centimeters.

When these solid particles are loaded into a reactor, it is essential that they are deposited intact on the bottom of the reactor or on the bed support plate, because if they break into small fragments they may block the outlet manifold of the reactor or the support plate, creating a pressure difference between the reactor inlet and outlet, which has a highly adverse effect on the efficiency of the reaction in the reactor and ultimately on the quality of the operator's intended production process.

The solid particles (inert balls or catalyst particles) must therefore be loaded without breakage or wear, in other words without any impact between the particles or against the walls of the reactor, that is to say without the presence of energy which might result, for example, from an excessive fall velocity inside the reactor.

In his patent application FR-A1-2 829 107, the present applicant has proposed a serpentine or helical semi-rigid sleeve in which the particles descend by rolling along the inner face of the sleeve, the velocity of descent (and consequently the kinetic energy at the end of travel) being adjustable by varying the inclination of the slope of the sleeve. However, this device is bulky because of its serpentine or helical shape and the relative rigidity of the material from which the sleeve is made, making it difficult to transport, to install, and to dismantle through the passage openings ("manholes") in the reactor.

In his patent application FR 2 874 212, the present applicant has also proposed a cylindrical flexible straight sleeve inside which a helical ramp, fixed on a central axis and wound around this axis, is used to limit the velocity of descent of the balls on said ramp. However, for very tall reactors, for example those with heights of more than thirty meters, there are potential hazards which may arise, for example, as a result of the tearing of the sleeve when it is fully loaded, in other words when its whole length is filled with solid particles. These hazards may potentially endanger the operators working at the bottom of the reactor.

In his application FR-A1-2 901 778, the present applicant has proposed a rigid sleeve formed from a plurality of basic units fastened to each other by sets of threaded rods and nuts positioned on the outside of the basic units. Each basic unit is provided with two diametrically opposed fastening flanges, each designed for attaching and/or guiding at least one fastening chain or line necessary for maintaining the sleeve inside the enclosure. This rigid sleeve includes at least one conduit for introducing particles into the reactor, in which a movable element for controlling the fall velocity of these particles is moved by means of a line. This movable element is conical or cylindrical in shape, with a height in the range from one to five times the inside diameter of the conduit, and is provided with a seal on its periphery to prevent the passage of particles between its periphery and the inner wall of the conduit.

However, this sleeve has the drawback of being particularly heavy and bulky because of the rigid material used to form each basic unit, and is therefore difficult to transport for use in reactors remote from each other or at industrial sites at a distance from its management and maintenance center. Furthermore, it is sometimes difficult to align the individual basic units correctly during their assembly, and this may lead to misalignment of the inner conduit portions of two adjacent basic units, causing the movable element to become jammed as it passes through the conduit.

Unlike the semi-rigid or flexible sleeve described in FR-A1-2 829 107 and FR-A1-2 874 212, the rigid sleeve described in FR-A1-2 901 778 cannot be flattened, curved or deformed.

DETAILED DESCRIPTION OF THE INVENTION

Figure 1:
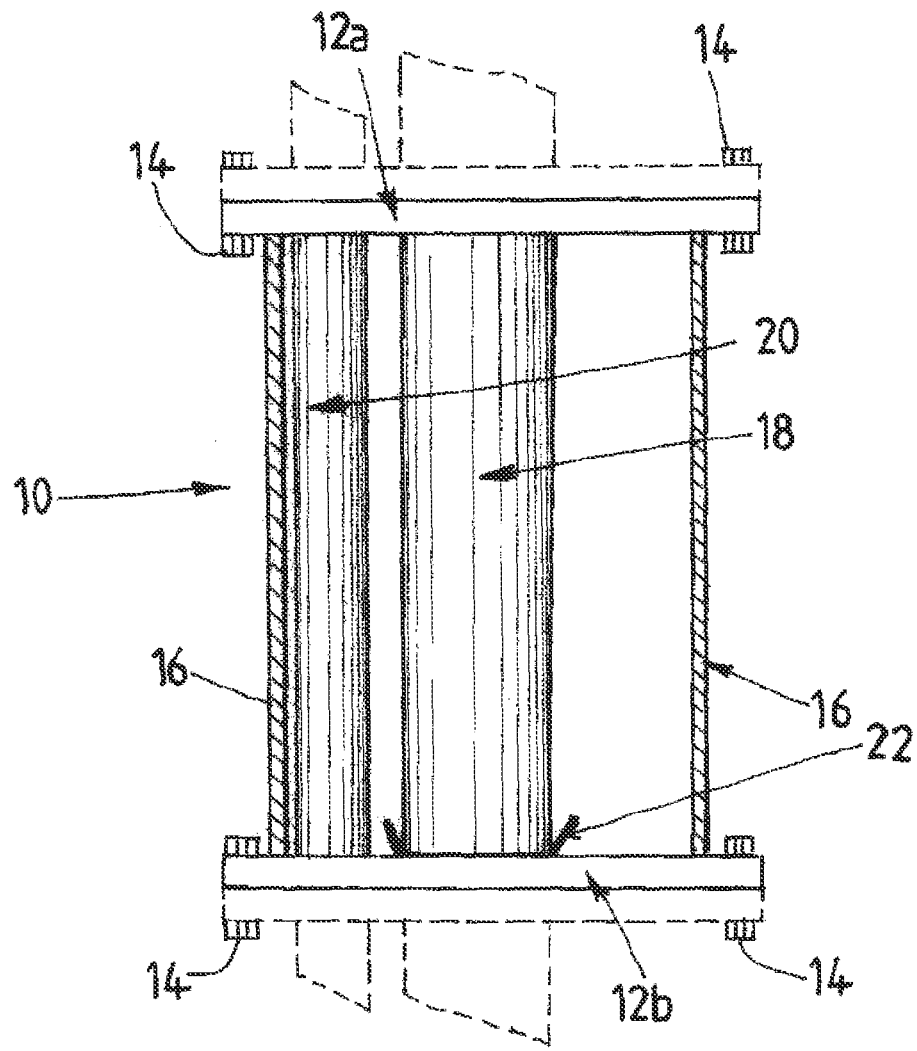
FIG. 1 is a side view of part of the device according to one embodiment of the invention.

The object of the present application is to propose a device for loading solid particles into an enclosure which is lightweight, is very easily assembled, dismantled and transported, and creates only very limited wear on the solid particles when the latter are conveyed into said enclosure by means of said loading device according to the invention.

To this end, the invention proposes a device for loading solid particles into an enclosure, notably a chemical or petrochemical reactor, comprising at least one conduit for the passage of the solid particles and at least one movable element for controlling the fall velocity of the particles, this element being designed to be slidably movable inside said conduit, characterized in that said device comprises a plurality of identical guide plates interconnected by fastening means, and in that said at least one conduit is made from a flexible material, each guide plate having at least one through opening for receiving and guiding said at least one conduit in a position in which the longitudinal axis of the conduit extends substantially perpendicularly to the plane of each guide plate.

Thus the device according to the invention has a very light framework, most of the weight of which is due to the guide plates whose total surface area is reduced significantly by comparison with a device such as that described in FR-A1-2 901 778.

In the position of use of the device according to the invention, the fastening means are shaped so that the guide plates are spaced apart from each other along the longitudinal axis of the conduit, or so that sets of two interconnected adjacent guide plates are spaced apart from each other along the longitudinal axis of the conduit.

The guide plates are advantageously interconnected by reversible fastening means. In this case, the device can be dismantled very easily, by progressively detaching each guide plate from the adjacent plate, the guide plates being easily stored because of their small overall dimensions.

Even if permanent fastening means are used, the device still has small overall dimensions, particularly if the conduits are independent of the guide plates. The latter can then be stacked on each other while remaining interconnected, after the removal of the conduit or conduits.

Each flexible conduit can be made of any material having sufficient mechanical strength to resist tearing during the loading procedure. The material may be, for example, a textile material, preferably knitted or woven, or a sheet of plastic material, reinforced if necessary with fibers or with a textile material. The term "flexible conduit" denotes a conduit which can be bent easily without being broken or damaged. In the present invention, the term may denote not only a conduit that can be completely flattened when empty, but also a semi-rigid conduit, reinforced by rigid annular elements placed at regular intervals, which allow the sleeve to be curved but prevent it from being flattened. Thus, the flexible conduit used in the present invention can be flattened, curved or deformed, unlike the rigid sleeve described in FR-A1-2 901 778.

The flexible conduits advantageously have a circular cross section, as do the corresponding guide openings in the plates.

Advantageously, the guide plates are of generally oblong shape, with the smaller dimension slightly greater than the diameter of the largest conduit, so as to limit the overall dimensions of the device according to the invention.

Like all plates, the guide plates according to the invention are elements made of rigid material which are flat and relatively thin; in other words, their thickness is their smallest dimension, meaning that their thickness (defined as the dimension in a direction perpendicular to the plane of the plate) is smaller than their length or their width (defined as the dimensions of the plate in the plane of the plate).

The thickness of the plates is determined as a function of the material from which the plate is made, and is, notably, sufficient to prevent any deformation of the plate while the device according to the invention is in use. However, in order to limit the weight of the plate, the thickness of each guide plate may be from 0.1% to 10% of the distance between two adjacent guide plates, or between two sets each formed by two guide plates assembled together; alternatively, it may be from 0.2% to 8.5% or from 0.4% to 1.5% of this distance.

The distance between two adjacent guide plates, or between two sets each formed by two guide plates assembled together, is, for example, in the range from 1 m to 1.2 m. This distance is defined in the position of use of the device and is measured along the longitudinal axis of the conduit.

For any distance between two adjacent guide plates, or between two sets each formed by two guide plates assembled together, the thickness of each guide plate may be, for example, from 0.2 cm to 10 cm, or preferably from 0.5 cm to 1.5 cm.

The plates are, for example, made from metal or from plastic material having the required strength.

In the remainder of the description, the position of use of the device according to the invention is defined as the position in which it is used to fill an enclosure, with the conduit or conduits of the device extending substantially vertically. The terms "upper" and "lower", and "top" and "bottom", relate to this position of use.

In a variant, the flexible conduit or conduits are formed from segments interconnected by fastening and joining means. These segments of flexible conduit can be joined, for example, by collars which link together flanges provided at the ends of each segment of flexible conduit.

In a specific embodiment, the device according to the invention includes a plurality of modules, each module comprising an upper guide plate and a lower guide plate connected to each other, and each module including reversible means for fastening to another module, such that, when two modules are assembled, their upper and lower guide plates are superimposed and in face-to-face contact.

This arrangement allows the device according to the invention to be dismantled with particular ease and facilitates its handling and assembly at another site.

This assembly and dismantling can be further facilitated in a variant in which each conduit is formed from a plurality of segments, each guide plate of a module is provided with means for fastening an end of a segment, and each module comprises at least one segment of conduit whose ends are fixed to the guide plates of said module. The lower and upper guide plates of a module are thus separated by a distance equal to the length of the segment of conduit, in the position of use of the device.

The reversible fastening means are, for example, arranged to enable the guide plates of adjacent modules to be assembled.

The modules of the device according to the invention can be aligned more easily than those of the prior art devices, because the guide plates are lighter and can therefore be manipulated more easily to place them in contact with each other in such a way that they are exactly superimposed, thus ensuring the alignment of the conduits. Furthermore, it is easier to manufacture plates of identical dimensions with low manufacturing tolerances, by contrast with the prior art modules, which have relatively complex three-dimensional shapes that may be difficult to manufacture with low tolerances.

In a variant, the conduit or conduits may be formed from segments interconnected by fastening and joining means, and the guide plates may be interconnected in sets of two in modules, the conduit or conduits being independent of the guide plates.

In particular, the guide plates are advantageously provided with a sealing element designed to ensure the sealing of at least one conduit between two adjacent modules.

In a specific embodiment, this sealing element may comprise a metal frame whose upper and lower faces are each provided with a seal, said sealing element being interposed between two guide plates of two adjacent modules. This arrangement can prevent the seal from being sucked into the conduit when there is a negative pressure in the latter.

Clearly, other sealing configurations are feasible.

Possibly, a separate sealing element can be provided for each conduit, or a single sealing element can be provided to seal all the conduits.

Advantageously, in one embodiment, the guide plates of a single module are interconnected by means of at least two lengths of line. These lengths of line are, for example, connected to opposite ends of a guide plate.

In a first variant, the lines may be flexible, in which case the guide plates are kept at a distance from each other by the effect of gravity when the device is in the position of use. These flexible lines can be fastened irreversibly, for example by welding or any other suitable method, or reversibly, for example by snap-hooks or any other appropriate devices.

If these lengths of line are used to connect the guide plates of a single module, they can be fastened permanently to each guide plate, although a reversible fastening is preferable.

In a second variant, rigid lines, such as bars or tubes screwed on to each guide plate, may equally well be used.

In another embodiment, at least two lines connect all the guide plates of the device to each other. In this case, the lines extend over the whole height of the device, passing through the guide plates, the latter being kept spaced apart from each other, for example by means which lock each plate on the lines. The lines can then be used as handling lines for the device, allowing the device to be lowered or raised inside an enclosure.

The device according to the invention can also comprise at least two handling lines, one of the ends of which is connected to a guide plate at a lower point on the device in its position of use, while the other end is shaped to be connected to a lifting hoist. These handling lines can be fastened to the lowest module, preferably to the upper plate of the latter, although fastening to the lower guide plate or to both plates of the module would be feasible. If no module is present, the ends of the handling lines can be fastened to the lower end guide plate of the device.

Advantageously, the device according to the invention can comprise at least two conduits of flexible material, namely at least one conduit for the passage of solid particles and at least one conduit which can be kept at negative pressure to extract any dust present in the enclosure. In most cases, this dust is essentially the dust that partially coats the solid particles before loading, this dust being put into circulation during the movement of said solid particles, for example when they are loaded into the enclosure. The dust may also be formed by breakage of the solid particles which may occur during loading.

Advantageously, each guide plate can have at least one aperture designed to receive and guide one or more identical or different longitudinal elements selected from among liquid, gas and electricity supply lines and a tool transport line.

Unlike the conduit guide openings formed in the guide plates, the edges of these apertures are not closed, but are open to allow the introduction of the longitudinal elements. This open part is advantageously smaller than the inside of the aperture, to prevent the longitudinal elements from falling out of the aperture during the manipulation of the device according to the invention, and particularly during loading.

In an advantageous embodiment of the invention, each guide plate is provided with a means for guiding the movable element that passes through the inside of the conduit. This guide means may be located inside or outside the conduit. In particular, if the conduit is independent of the guide plates, in the case of a one-piece conduit for example, the guide means will be outside the conduit. In the case of conduits composed of segments, which may be arranged in modules, the guide means may be either inside or outside the conduit.

It may be, for example, a flared truncoconical surface positioned on one face of a guide plate, or potentially on both faces of the plate. This truncoconical surface is advantageously positioned around the whole periphery of the guide opening of the conduit in which the movable element slides.

In order to facilitate the introduction of the movable element into a conduit of the device according to the invention, the upper end of the conduit in question may also be made with a flared shape.

Since the conduit or conduits of the device according to the invention are flexible, their inside diameters may not be strictly circular over the whole height of the device. Additionally, in the embodiment formed from modules, seals may be present between all the modules: in this case, their alignment with the conduit may not be exact. Because of these characteristics, a movable element formed by a compact block of hard material may become jammed inside the device according to the invention, resulting in losses of time, or it may fail to perform its function because it allows particles to pass through, if its profile ceases to mate with the inner wall of a deformed conduit.

In order to overcome these drawbacks, the applicant proposes a movable element made from a flexible material, which, when unconstricted, has dimensions greater than those of the cross section of the conduit receiving it, said movable element being shaped so as to be deformed and become bowl-shaped when it is inside the conduit, so that its free edges mate with the inner walls of the conduit.

The term "bowl-shaped" describes a hollow shape whose concavity faces the top of the loading device according to the invention, when the device is in the position of use. Advantageously, the resulting hollow shape has no openings in it, and therefore any particles located above it cannot pass through it.

A movable element of this type can thus adapt to any variations in the inside diameter of the conduit through which it passes, or to any imperfect circularity of this conduit, without any risk of being jammed inside, while eliminating the risk of a fall of particles below the movable element.

In a specific embodiment, the movable element comprises at least one disk of flexible material with cut-outs on its edge, the diameter of the disk being greater than the inside diameter of the conduit receiving the movable element, and the center of each disk being provided with a support means.

The ratio of the diameter of a disk of the movable element to the inside diameter of the conduit is, for example, in the range from 1.1 to 2, or preferably from 1.1 to 1.5, for example 1.2.

The material from which the movable element is made can be a flexible or semi-rigid material, of the elastomer type for example, reinforced if necessary.

The cut-outs are preferably made in such a way that the edges of the cut-outs are adjacent to each other when the movable element is placed inside the conduit, with the device in the position of use. These cut-outs are preferably distributed regularly over the periphery of a disk and/or are identical.

The cut-outs made on the edge of the disk are, for example, open sectors whose vertices are separate from the center of the disk. The vertices of the open sectors are, for example, positioned at a distance from the center equal to 0.4 to 0.6 times the radius of the disk, for example at a distance equal to 0.5 times the radius of the disk.

The open sectors have angles in the range from 5° to 40°, or preferably from 10° to 35°, for example from 15° to 30°. Advantageously, each open sector is formed by two angles, $\alpha$ and R.

The angle $\alpha$ is located in the inner part of the sector and is smaller than the angle $\beta$; for example, $\alpha$ is from $0.4\,\beta$ to $0.6\,\beta$, preferably $0.5\,\beta$.

The angle β is located in the outer part of the sector and is in the range from 10° to 40°, or preferably 25° to 35°, for example 30°. This angle β starts at a distance equal to 0.6 to 0.8 times the radius of the disk, for example 0.7 times the radius of the disk.

More particularly, the support means may be a rod, and a plurality of disks may be distributed along the rod in at least one stage. Each stage may comprise one disk only, but advantageously it is formed by at least two or three flexible disks superimposed and in contact with each other.

The presence of a plurality of disk stages facilitates the descent of the movable element by ensuring that the movable element descends vertically when the device according to the invention is in the position of use.

The distance between two stages may be 1 to 2 times the inside diameter of the conduit receiving the movable element, or preferably 1.2 to 1.8 times this diameter, for example 1.5 times the inside diameter. Advantageously, the support rod of the movable element is a threaded rod allowing the distance between the stages to be adjusted.

The disks are fixed to the rod by retaining means. These retaining means are, for example, washers located on both sides of a disk or of a plurality of superimposed disks, and retained in position on the rod, for example by pins or by bolts screwed onto the rod if the latter is threaded, or any other appropriate retaining means. The dimensions of the washers are preferably chosen so that the washers do not cover the cut-outs of the disks.

The configuration of the movable element used can thus be adapted easily according to requirements, and the various elements can be replaced easily in case of damage, by contrast with the prior art movable elements. This element is therefore particularly simple and easy to produce and is inexpensive, while exactly mating with the inner wall of a conduit, regardless of the imperfections of the circularity of the latter.

The movable element may comprise a plurality of disks in a quincuncial arrangement.

By means of these specific arrangements (the plurality of stages and/or the quincuncial arrangement of the disks) it is possible to ensure that the particles located above the movable element when the device is in the position of use cannot pass to the bottom of the device and fall to the bottom of the reactor if the device is too high.

For example, the movable element may include the following arrangements (the last of these configurations being preferred):

two stages, each formed by two superimposed disks, preferably in a quincuncial arrangement;

three stages, each formed by two superimposed disks, preferably in a quincuncial arrangement;

two stages, each formed by three superimposed disks, preferably in a quincuncial arrangement.

The movable element may also be provided with a grippable means on its lower face, enabling it to be extracted from the conduit via the lower end of the latter when the device is in the position of use.

This means may be a simple ring to which a hook or a spring hook can be attached.

The invention will now be described with reference to the attached non-limiting drawings.

FIG. 1 shows a module 10 of a preferred embodiment of a device for loading solid particles into an enclosure according to the invention. The device according to the invention has the advantage of being light-weight by comparison with the device described in FR 2 901 778 A1. In this drawing, the module is shown in the position of use of the loading device, in which the longitudinal axis of the conduits extends substantially vertically, perpendicularly to the plane of each guide plate.

In this embodiment, the device includes a plurality of modules 10.

Each module 10 comprises an upper guide plate 12a and a lower guide plate 12b connected to each other.

Each module 10 further includes reversible means 14 for fastening to another adjacent module 10, such that, when two modules are assembled, their upper and lower guide plates are superimposed and in face-to-face contact, as shown in FIG. 1. In this FIG. 1, the elements of the adjacent modules located above and below the module 10 (illustrated in solid lines) are shown in broken lines.

As a general rule, the reversible fastening means 14 of two guide plates are positioned at the ends of the plates, most often at the opposite ends.

In the example, the reversible fastening means 14 are sets of screws and nuts.

The upper guide plates 12a and lower guide plates 12b of the illustrated module are connected by two lengths of line 16, each located at one end of the guide plates.

The module 10 which is illustrated further comprises a segment 18 of a first flexible conduit, for example a conduit intended for passing particles into an enclosure, and a segment 20 of a second flexible conduit, for example a conduit intended for extracting any dust present in the enclosure during load.

Additionally, the guide plates, particularly the lower guide plate 12b of a module, are provided with a guide means 22, for guiding the movable element that moves by sliding inside the conduit; in other words, the movable element is displaced by translation along the longitudinal axis of the conduit.

In the example, this guide means 22 is a flared truncoconical surface positioned on a face of the lower guide plate 12b, at the edge, or close to the edge, of the conduit guide opening formed in the guide plate. As a general rule, this guide means 22 may be located inside or outside the conduit or the segment of conduit.

Finally, a sealing element (not shown) is generally interposed between the assembled guide plates of two adjacent modules to seal each conduit between two adjacent modules.

This element may, for example, be a seal made of rubber or any other appropriate material. Advantageously, two seals may be provided, these seals being placed on the opposite faces of a metal frame interposed between the guide plates along the periphery of at least one of the guide openings of a guide plate, for example the opening intended to receive the segments 20 of the extraction conduit.

Figure 2:
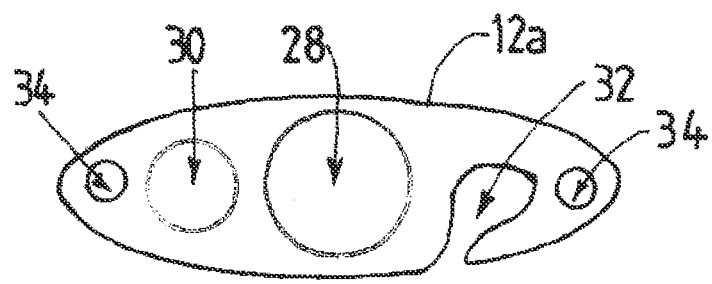
FIG. 2 is a top view of a guide plate used in one embodiment of the device according to the invention.

The guide plates 12a or 12b are all identical in each loading device according to the invention. FIG. 2 shows a top view of an exemplary embodiment of a guide plate 12a.

The guide plate 12a is of generally oblong shape, with the smaller dimension slightly greater than the diameter of the largest conduit (the conduit 18 in this example). Clearly, the guide plates according to the invention can be made in numerous other shapes.

This guide plate 12a has two through openings 28 and 30 for receiving and guiding the conduits 18 and 20 respectively. The larger opening 28 receives the particle loading conduit 18, and is advantageously positioned substantially in the center of the plate. The opening 30 of smaller diameter receives the extraction conduit 20 and is located between the opening 28 and an end of the plate 12a.

The conduit segments 18 and 20 can be fastened to the plate by any appropriate means. For example, it is possible to use a clamping collar which clamps each end of a segment onto a corresponding flange of the guide plate (not shown), this flange being formed by a cylindrical upstand of the opening receiving the conduit.

Thus this flange is placed inside the flexible conduit. Its free edge can then be advantageously flared to form the guide means 22 described above.

On the other side of the opening 28, there is an aperture 32 designed to receive and guide one or more identical or different longitudinal elements selected from among liquid, gas and electricity supply lines and a line for transporting a tool, such as a lamp or filling control device, or any other commonly used device.

Unlike the openings 28 and 30 which have a closed circular edge, the edge of this aperture 32 has an open form of any shape as shown in FIG. 2, allowing the longitudinal elements to be introduced into it.

Finally, openings 34 are provided at the opposite ends of the guide plate 12*a* for the passage of the fastening means 14 for fastening two adjacent plates 12*a*, 12*b*.

Thus it will be evident that the device according to the invention can be assembled and dismantled very easily by assembling and detaching the modules. For example, during loading, modules can be added at the upper end of the device in order to increase the height of the latter progressively until the bottom of the enclosure can be reached. When the device is raised to remove it from the enclosure, the modules can also be detached from the upper end of the device.

The device according to the invention can be raised and/or lowered, notably, by means of handling lines, generally two in number, the ends of which are connected, on the one hand, to a guide plate at the lower end of the device in its position of use, and, on the other hand, to a lifting hoist.

In an embodiment (not shown) in which the conduit extends over the whole height of the device, the guide plates can be added progressively at the top of the device as the device is lowered into the enclosure, or can be detached (from the top once again) when the device is raised again. In the latter case, it may be necessary to cut the flexible conduits when the device is raised.

It would also be feasible to use flexible conduits formed from segments interconnected by appropriate fastening and joining means known in the art. Segments of flexible conduit can, for example, be joined by collars which link together flanges provided at the ends of each segment of flexible conduit. Each segment can then easily be assembled and/or detached when the device is lowered and/or raised.

If flexible conduits independent of the guide plates are used, it will evidently not be necessary to assemble two successive guide plates face to face, although this could be done; it is sufficient to provide guide plates distributed regularly over the whole height of the device.

In order to control the descent of the particles to be loaded into the enclosure by means of the device according to the invention, the device also comprises a movable control element designed to move by sliding inside a conduit of the device.

According to the invention, this movable element is made from a flexible material, the shape and material of the element being selected, on the one hand, so that, when unconstricted, it has dimensions greater than those of the cross section of the conduit receiving it, and, on the other hand, so that it can be deformed and become bowl-shaped when it is constricted (by insertion into a conduit), so as to mate with the inner walls of the conduit.

Figure 3:
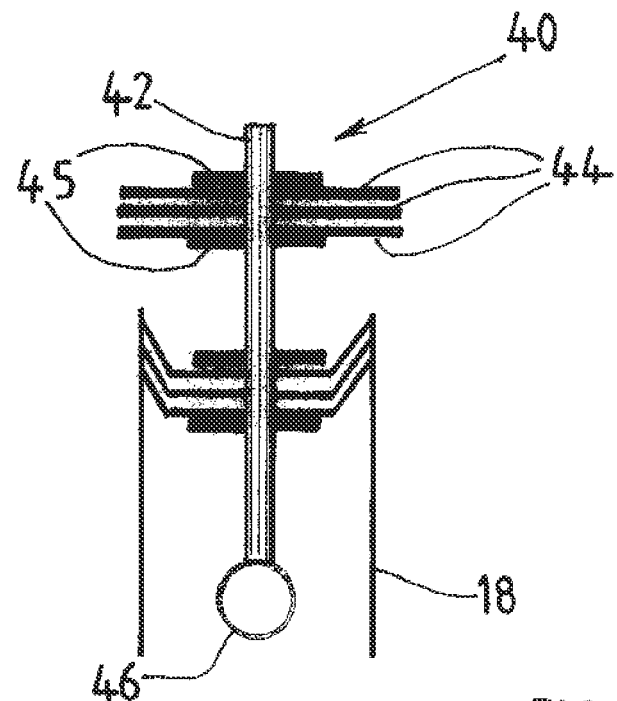
FIG. 3 is a schematic representation of a movable element of the device according to the invention in a specific configuration.

FIG. 3 shows an exemplary embodiment of a movable element 40 of this type.

The movable element 40 which is shown comprises a rod 42 forming a support means, on which is mounted a plurality of disks 44 of flexible material, such as an elastomer, reinforced if necessary.

In the example, the movable element comprises six disks 44 distributed in two stages of three disks each. In each stage, the disks are placed against each other and retained in position by means of two washers 45 passed through the rod and fixed one on each side of the disks. These washers can be retained in position, for example, by means of pins passing through the rod, or by nuts if the rod is threaded, or by any other appropriate means. The movable element which is shown further comprises a ring 46 forming a grippable means, this ring being fixed to the lower end of the rod 42 on its lower face, thus enabling it to be extracted from the conduit via the lower end of the latter when the device is in the position of use.

Each disk 44 has a diameter greater than the inside diameter of the conduit receiving the movable element.

Thus, when the movable element 44 is outside the conduit, each disk is substantially horizontal (as in the upper stage in FIG. 3). When the element is introduced into a conduit, the disks are deformed into a bowl shape, as can be seen in the lower stage of disks in FIG. 3, and therefore retain the particles because the disks mate with the inner wall of the conduit.

In this way the movable element descends progressively inside the conduit, the particles to be loaded being located above the highest stage of disks. When it reaches the lower end of the conduit, the movable element is extracted from the latter via this lower end, for example by being pulled by its ring 46, and is then raised and removed from the enclosure outside the device according to the invention.

Figure 4:
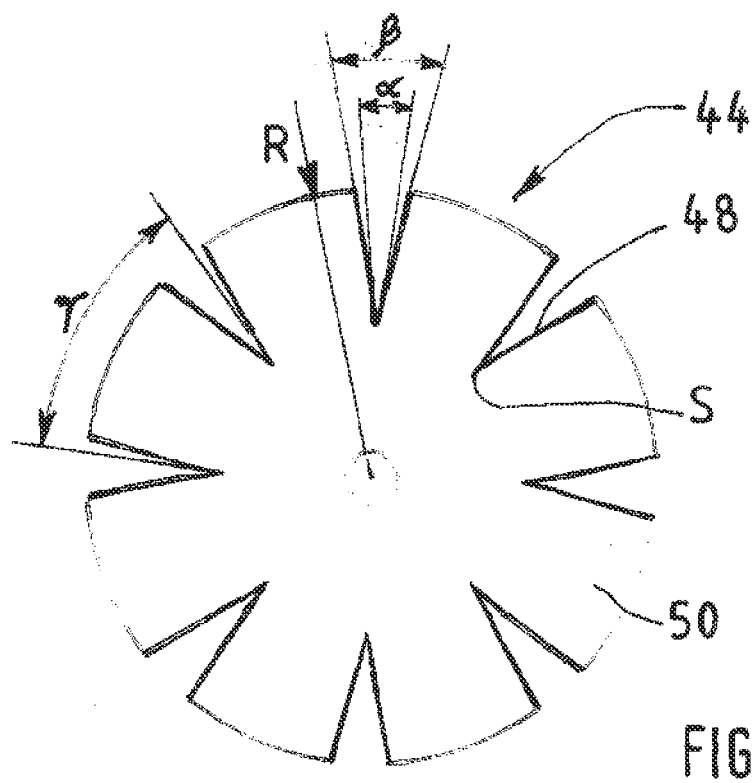
FIG. 4 is a top view of a disk of a movable element of the device according to the invention.

FIG. 4 shows a top view of an exemplary embodiment of a disk 44. In this example, the disk 44 has a diameter of 1.5 times the inside diameter of the conduit for which it is intended.

The center of the disk 44 is pierced for the passage of the rod 42.

This disk 44 has cut-outs 48 made in such a way that the edges of the cut-outs are contiguous to each other when the movable element is deformed by being introduced into the conduit.

In the illustrated example, the cut-outs 48 are open sectors, the vertex S of each cut-out being separated from the center of the disk by a distance of half a radius of the disk. Each open sector is formed by two angles, $\alpha$ and $\beta$. The angle $\alpha$ is located in the inner part of the sector, and the angle $\beta$ is located in the outer part of the sector. In the example, the angle $\alpha$ is equal to half the angle $\beta$, this angle $\beta$ starting at a distance of 0.7 times the radius R of the disk.

Finally, the edges of two successive cut-outs 48 form an angle $\gamma$ of 45° in the illustrated example. Evidently, this angle $\gamma$ is equal to 360° divided by the number of strips, a strip 50 being defined as the material located between two cut-outs 48. In the example, the disk comprises eight strips 50.

Additionally, in order to avoid interfering with the deformation of the disks when they are introduced into the conduit, the dimensions of the retaining washers 45 used are selected so that the washers do not cover the cut-outs.

The invention claimed is:

1. A device for loading solid particles into an enclosure, said device comprising at least one conduit for the passage of said solid particles, at least one control unit for controlling the fall velocity of the particles, and a plurality of identical guide plates interconnected by a fastening means, wherein said control device is slidably movable inside said at least one conduit, wherein said at least one conduit is made from a flexible material, and wherein each of said plurality of guide plates has at least one through opening for receiving and guiding said at least one conduit in a position of use in which the longitudinal axis of said conduit extends substantially perpendicularly to the plane of each guide plate.

2. The device as claimed in claim 1, characterized in that said at least one conduit is formed by a plurality of segments interconnected by a further fastening means.

3. The device as claimed in claim 1, characterized in that, in the position of use of the device, said fastening means are shaped so that said plurality of guide plates are spaced apart from each other along the longitudinal axis of said conduit, or sets of two interconnected adjacent guide plates are spaced apart from each other along the longitudinal axis of said conduit.

4. The device as claimed in claim 1, characterized in that the device further comprises a plurality of modules, wherein each of the plurality of modules comprises an upper guide plate and a lower guide plate connected to each other, and a further fastening means for fastening two adjacent modules such that said upper guide plate of one module is superimposed and in face-to-face contact with said lower guide plate of the adjacent module.

5. The device as claimed in claim 4, characterized in that the at least one conduit comprises a plurality of segments, wherein said upper and lower guide plates of each of the plurality of modules is provided with another fastening means for fastening an end of at least one of said plurality of segments to said upper and lower guide plates of said module.

6. The device as claimed in claim 4, characterized in that said upper and lower guide plates ensure the sealing of at least one conduit between two adjacent modules.

7. The device as claimed in claim 4, characterized in that said upper and lower guide plates of a single module are interconnected by means of at least two lengths of line.

8. The device as claimed in claim 1, characterized in that said plurality of guide plates are connected to each other via at least two lines.

9. The device as claimed in claim 1, characterized in that said device further comprises at least two handling lines, wherein one of the ends of each of the two handling lines is connected to a guide plate at a lower point on the device in its position of use, while the other end of each of the two handling lines is shaped to be connected to a lifting hoist.

10. The device as claimed in claim 1, characterized in that said device further comprises at least two conduits of flexible material, wherein at least one conduit is for the passage of solid particles and at least one conduit is kept at negative pressure to extract any dust present in the enclosure.

11. The device as claimed in claim 1, characterized in that each of said plurality of guide plates includes at least one aperture to receive and guide one or more identical or different longitudinal elements selected from among liquid, gas and electricity supply lines and a tool transport line.

12. The device as claimed in claim 1, characterized in that each of said plurality of guide plates is provided with a guiding unit for guiding said control unit that passes through the inside of said conduit.

13. The device as claimed in claim 1, characterized in that said control unit is made from a flexible material, which, when unconstricted, has dimensions greater than a cross section of the at least one conduit receiving said control unit, said control unit being shaped so as to be deformed and become bowl-shaped when said control unit is inside said conduit, so that free edges of said control unit mate with inner walls of said conduit.

14. The device as claimed in claim 13, characterized in that said control unit comprises at least one disk of flexible material with cut-outs-on its edge, a diameter of said at least one disk being greater than an inside diameter of said at least one conduit receiving said control unit, and the center of said at least one disk being provided with a support means.

15. The device as claimed in claim 14, characterized in that said support means is a rod, and a plurality of disks are distributed along said rod in at least one stage.

16. The device as claimed in claim 15, characterized in that said at least one stage is formed by at least two flexible disks superimposed and placed in contact with each other.

17. The device as claimed in claim 13, characterized in that said control unit comprises a plurality of disks in a quincuncial arrangement.

18. The device as claimed in claim 1, characterized in that said control unit is provided with a grippable means on its lower face.

19. The device as claimed in claim 1, wherein the enclosure is a chemical or petrochemical reactor.

* * * * *